UNITED STATES PATENT OFFICE.

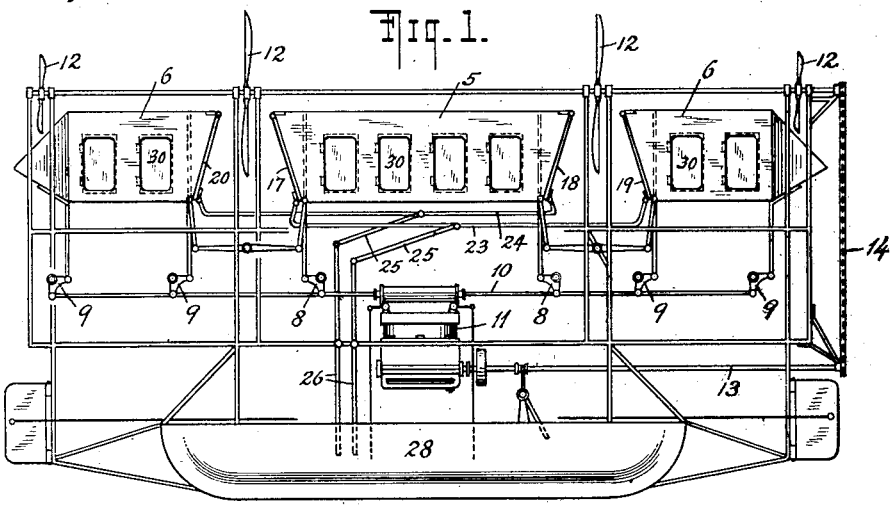

JOHN NEFF, SR., OF WEST HOBOKEN, NEW JERSEY.

AIRSHIP.

1,370,902.

Specification of Letters Patent.

Patented Mar. 8, 1921.

Application filed February 21, 1920. Serial No. 360,496.

*To all whom it may concern:*

Be it known that I, JOHN NEFF, Sr., a citizen of the United States, and resident of West Hoboken, county of Hudson, and State of New Jersey, have invented certain new and useful Improvements in Airships, of which the following is a specification.

My invention relates to an airship of the type shown in my Patent #1,298,082 of March 25, 1919, and has for its object to improve the construction thereof in a manner to increase the efficiency of the airship, and to facilitate its operation. The invention comprises the various features of novelty more fully pointed out in the specification and appended claims.

In the accompanying drawings, Figure 1 is a side elevation of an airship embodying my improvements; Fig. 2 is an enlarged detail view of the wings; Fig. 3 is a vertical cross section on the line 3—3 of Fig. 2 through one of said wings; Fig. 4 is a similar view on the line 4—4 of Fig. 2 and Fig. 5 is a detail longitudinal section of a portion of the wings.

In the illustrated example the airship is provided with a plurality of vertically movable wings, 5 and 6, which, as in my patent, previously mentioned, may be hollow and of peaked form in cross section, three of said wings being shown. The sides of each wing diverge from the top downwardly, its ends being closed by end members 7, while its bottom is open to form in substance an inverted trough.

The wings 5 and 6 are vertically reciprocated for instance by means of the mechanism shown in my prior patent and consisting of bell cranks 8 and 9 connected respectively with the wings and with a reciprocating rod 10 receiving its motion from a motor 11, the arrangement being such that the central wing 5 and conjointly the two end wings 6 are alternately actuated in opposite direction. Propellers 12 are mounted between shaft 13 of the motor 11 by means of a chain drive 14.

The opposed ends of the wings 5 and 6 are inclined in opposite directions as indicated at 15 and 16, upright blades 17, 18, 19 and 20 being located adjacent to said ends and pivotally connected with the wings 5 and 6 at 21 and 22 respectively. The blades 17 and 19 and the blades 18 and 20 are arranged to be tilted forwardly and backwardly and for this purpose are connected in coöperating pairs to longitudinally disposed rods 23 and 24. The latter are connected by means of links 25 with levers 26 pivoted at 27 and arranged within reach of the aviator seated within the car 28.

In addition the wings 5 and 6 are constructed with a series of openings 29 each controlled by a pivotally mounted shutter or flap 30, suitable springs 31 being provided for maintaining said shutters in their closed positions and for returning them thereto. The purposes of this arrangement and construction will appear more fully from the description hereinafter.

Furthermore in the preferred construction the wings 5 and 6 are provided at their lower edges with extensions 32 which may incline downwardly as indicated and which preferably have their free edges curved or bent downwardly as shown in Figs. 2 and 3, said extensions 32 having been omitted in Fig. 1 for the sake of clearness. The extensions are also each provided with a series of openings 33 similar to the openings 29 and similarly controlled by pivotally mounted shutters of flaps 34 which under the influence of suitable springs similar to the springs 31 are likewise maintained in and returned to their closed positions.

In order to effect an ascent, the blades 17, 18, 19 and 20 are set in vertical positions and rapid reciprocating motion is imparted to the wings 5 and 6. During the upward movements of the wings the peaked tops thereof will cut the air freely and at the same time the pressure of the air will cause the shutters 30 and 34 to swing to their open positions against the tension of the respective springs 31 and 35 thus freeing the openings 29 and 33 and permitting the air to rush therethrough. In this way the resistance of the air to the upward movements of said wings is reduced to a minimum. As the wings describe downward movements the air is forced beneath the wings by the extensions 32 and pressure of said air, assited by the action of the respective springs 31 and 35 will quickly close said shutters 30 and 34, thereby again presenting unbroken wing surfaces. In this manner the air is entrapped within the wings and forms cushions on which the machine is lifted, each time the wings are moved downwardly, the direction of lift being substantially vertical as long as the blades 17, 18, 19 and 20 occupy vertical positions. For advancing, the propellers 12 are actuated and said blades, which as before stated operate in pairs, are set at a forward tilt while for backing the blades are set at a backward tilt, the inclined opposed ends of the wings permitting these tilting movements of said blades without interference. For descending, the motion of the wings is retarded, while the blades may be either righted, or set at a dip to effect the proper slant in landing.

The airship constructed according to my invention is efficient and reliable in operation and in case of engine or other trouble while in the air will descend in safety and without difficulty, the wings in such cases acting as parachutes to retard the speed of descent within the limits of safety.

Various changes in the specific form shown and described may be made within the scope of the claims without departing from the spirit of my invention.

I claim:—

1. In an airship, a plurality of peaked hollow wings, means for reciprocating said wings in opposite directions, vertically extending transverse blades, pivoted exteriorly of said wings adjacent to the ends thereof and means for selectively tilting said blades.

2. In an airship, a plurality of peaked hollow wings having their opposed ends inclined, means for reciprocating said wings in opposite directions, transverse blades pivotally connected at their upper ends to said wings adjacent to and exteriorly of the ends thereof and means for tilting said blades in coöperating pairs.

3. In an airship, a plurality of peaked hollow wings, means for reciprocating said wings in opposite directions and extensions projecting outwardly from the lower edges of said wings to force the air inwardly beneath the same during the downward movements of said wings.

4. In an airship, a plurality of vertically reciprocable wings provided with a series of openings, transverse extensions projecting outwardly from the lower edges of said wings and having a series of openings, shutters controlling all of said openings and being operated to open the same during the upward movements of said wings and to close said openings during the downward movements thereof, springs for maintaining said shutters in their closed positions and for returning them thereto, transverse blades pivoted exteriorly of said wings adjacent to their ends and means for selectively tilting said blades.

JOHN NEFF, Sr.